(12) United States Patent
Kiesel et al.

(10) Patent No.: US 6,889,097 B2
(45) Date of Patent: *May 3, 2005

(54) DATA SOURCE AND CONVERTER

(75) Inventors: Martin Kiesel, Poxdorf (DE); Maria Morgenroth, Wachenroth (DE); Georg Steinlein, Bayreuth (DE)

(73) Assignee: Siemens Aktiengesellschaft, Munich (DE)

(*) Notice: Subject to any disclaimer, the term of this patent is extended or adjusted under 35 U.S.C. 154(b) by 204 days.

This patent is subject to a terminal disclaimer.

(21) Appl. No.: 09/757,146

(22) Filed: Jan. 9, 2001

(65) Prior Publication Data

US 2002/0147523 A1 Oct. 10, 2002

Related U.S. Application Data

(63) Continuation of application No. 09/591,420, filed on Jun. 10, 2000, now Pat. No. 6,594,541, and a continuation of application No. 09/591,421, filed on Jun. 10, 2000, now Pat. No. 6,539,268.

(30) Foreign Application Priority Data

Jan. 10, 2000 (DE) ........................................ 100 00 626

(51) Int. Cl.[7] ............................................. G05B 11/01
(52) U.S. Cl. ............................. 700/18; 700/23; 700/83; 700/86; 700/87
(58) Field of Search ............................. 700/18, 23, 83, 700/86, 87, 100; 709/169; 341/88; 710/8

(56) References Cited

U.S. PATENT DOCUMENTS

| | | | | |
|---|---|---|---|---|
| 4,495,572 A | * | 1/1985 | Bosen | 709/250 |
| 4,720,784 A | * | 1/1988 | Radhakrishnan et al. | 710/107 |
| 4,821,170 A | * | 4/1989 | Bernick et al. | 710/36 |
| 5,291,391 A | * | 3/1994 | Mead et al. | 700/28 |
| 5,659,480 A | * | 8/1997 | Anderson et al. | 700/186 |
| 5,768,119 A | * | 6/1998 | Havekost et al. | 364/133 |
| 5,862,375 A | * | 1/1999 | Gephardt | 713/1 |
| 5,877,959 A | | 3/1999 | Kamiyama et al. | |
| 5,925,109 A | * | 7/1999 | Bartz | 710/14 |
| 5,930,141 A | * | 7/1999 | Kamiyama et al. | 700/159 |
| 5,933,638 A | * | 8/1999 | Cencik | 717/131 |
| 5,999,990 A | * | 12/1999 | Sharrit et al. | 710/8 |
| 6,209,037 B1 | * | 3/2001 | Brown et al. | 709/230 |
| 6,263,487 B1 | | 7/2001 | Stripf et al. | |
| 6,438,444 B1 | * | 8/2002 | Mizuno et al. | 700/169 |
| 6,470,225 B1 | * | 10/2002 | Yutkowitz | 700/44 |
| 6,539,268 B1 | * | 3/2003 | Wucherer et al. | 700/61 |
| 6,594,541 B1 | * | 7/2003 | Wucherer et al. | 700/159 |

FOREIGN PATENT DOCUMENTS

DE 296 00 609 U1 3/1997
DE 197 40 550 A1 4/1998

* cited by examiner

Primary Examiner—John Follansbee
Assistant Examiner—Aaron C Perez-Daple
(74) Attorney, Agent, or Firm—White & Case LLP

(57) ABSTRACT

The parameterization information needed in a universal motion controller UMC (description of system variables, alarms, and commands) is generated from a uniform description language via a central converter (U) and distributed to the engineering system (ES1–ES4), run time system (RTS1–RTS4), and output media (AM) for documentation. This ensures the consistency of parameterization data for all system parts. In addition, configuration information (FWK) from technology packets (TP) can be imported into the engineering (ES1–ES4) and run time RTS1–RTS4) systems of the controller.

15 Claims, 5 Drawing Sheets

DATA SOURCE AND CONVERTER

CROSS-REFERENCE TO RELATED APPLICATIONS

This application is a continuation of application Ser. No. 09/591,420, filed Jun. 10, 2000, now U.S. Pat. No. 6,594,541, and application Ser. No. 09/591,421, filed Jun. 10, 2000, now U.S. Pat. No. 6,539,268.

FIELD OF THE INVENTION

The invention pertains to a universal motion controller, with engineering and run time systems, that functionally combines the classic tasks of a programmable logic controller and a numerical controller.

BACKGROUND OF THE INVENTION

It is customary today to model different hierarchical run levels both for the PLC and for the motion controller, and to allocate to those run level software tasks for controlling a given technical process. While these tasks can fulfill system requirements, they can also be programmed by the user.

It is known that for a programmable logic controller "PLC," and thus for a motion controller "NC" as well, user programs or tasks created by the user can be loaded into the memory of a particular controller and executed there.

From DE 197 40 550 A1, it is known that process control functionalities of programmable logic controllers "PLC" and motion functionalities of an NC controller can be integrated into a uniform configurable controller system.

This PLC/NC integration takes place by interconnecting the PLC and NC controller assemblies. When integration is achieved in this way, however, an optimal and efficient task structure for the entirety of the controller tasks is not obtained. In addition, expanded functionality with respect to the process controller, and thus with respect to the motion controller, can be loaded and executed only in the form of user programs.

It is customary today to provide controllers with parameterization information. In this context, parameterization information includes the description of system variables with data type, attributes, and descriptive texts, the description of alarms, with their structure, attributes, and alarm texts, and the description of commands (motion and technology commands) with syntax and relevant parameters.

Typically, however, this parameterization information, which is needed at different locations within the controller, is implemented separately at each of those locations in the controller. It requires a very great effort to ensure the consistency of this parameterization information implemented at different locations.

The objective of the invention is the creation, in a simple manner, of optimal configurations for the combined PLC/NC controllers in respect to both their controller structure and their functionality for different controller tasks and the different constraints or requirements of the underlying technical process, thus ensuring that the parameterization information implemented in the controller is always internally consistent.

BRIEF SUMMARY OF THE INVENTION

The invention attains this objective with a uniform run level model designed to have several run levels of different types with different priorities, where various user and system-levels ranging from highest to lowest priorities are provided, so that technology packets can be loaded by the user into the engineering and/or run time systems and so that a data source makes commands and/or system variables available to the engineering system via a converter for descriptive information for system variables and, as needed, alarms and/or commands, so that the system variables with current technical process data are available from the run time system and additional input can be made by the user via a user interface for the engineering system.

A significant advantage of this invention is that the parameterization information for the controller, which is needed both in the engineering system and in the run time system, as well as for documentation and the possibility of test automation, is always consistent. The converter, which prepares and distributes the parameterization information from a central location for documentation, the engineering system, and the run time system, can perform semantics checks without great effort. OEM (original equipment manufacturer) customers can also create additional parameterization information in this data source for descriptive information, that is, at a defined location, without great effort and incorporate it into the documentation.

An additional advantage of the invention is that the controller tasks can be arranged within the run levels so as to reduce the effort required for communication within the controller.

An additional advantage is that, as a result of the loading of technology packets into the engineering and/or run time systems of the controller, the user can obtain user-specific scaling of the controller's run time system with respect to its functionality.

An initial advantageous configuration of the invention is that relevant documentation information from the data source can be forwarded by the converter to an output medium. This ensures that all documentation information originates from a common data source and is thus always internally consistent, regardless of the output medium (for example, printer or online help) on which the documentation information is output.

An additional advantageous configuration of the invention is that the following run levels are provided:
a) a position-control level, consisting of associated clocked system-level and user-level,
b) an interpolator level, consisting of associated clocked system-level and user-level,
c) an event system-level for events requiring response,
d) a user-level for asynchronous errors,
e) an additional user-level, freely plan-able by the user for specific requirements, for alarm and/or event and/or control and/or other cyclical tasks,
f) a group of levels made up of a series of motion sequences, free cycles, and other low-priority system tasks, for background processing,
where run levels a to e form a group of levels for real-time processing.

A significant advantage of this arrangement in levels is that communication between the process controller tasks and those of the motion controller is minimized. As a result, the controller tasks for the process controller and for the motion controller can be programmed in a uniform programming language with a uniform generation interface.

An additional advantageous configuration of this invention is that the technology packets contain:
a) code parts that represent the control specifics for the run time system, and b) a configuration part that shows the allocation of these code parts to each of the system-levels and the order in which they are processed, where c) this information of the configuration part can also be forwarded to the engineering system as needed.

This gives the user the possibility of a technological scaling of the controller's run time system as a result of the dynamic loading of such technology packets. Thus, starting from a basic system of the controller, the user can expand the supply of commands for this basic system or operating system in a way that is dynamically tailored to the particular requirements of the underlying technological process or controller task. Thus, the user has the possibility of expanding the available basic functionality of a controller to include precisely those functionalities that s/he really needs for her/his applications. In this case, the base system forms the scope of operations of the run time system of a controller, namely, a real-time operating system, a run time system (with system and user-levels), technology object types, commands, and the PLC command supply, as well as communication (for example, LAN, E/A) and technological interfaces (for example, drives, emitters) for the technical process. The basic system thus includes the necessary basic functionality of a controller. The basic system can be run on a wide range of HW platforms (for example, PC, drive, . . . ).

Given that the information in the configuration part of a technology packet can be transferred via the data source and converter into the run time system and the engineering system, parameterization and configuration information can be imported into the controller in a uniform fashion, and a user can make changes to the parameterization and configuration data from a central location. This parameterization information corresponds to data descriptions for the usual general aspects of the controller, namely, system variables, alarms, and commands. Configuration information, on the other hand, refers to the technology packets and thus to the possibility of technological scaling for a controller.

Given that each technology packet contains an adjusted number of technology object types for the run time system, it is possible to load even complex and sophisticated controller functionalities into the run time system in a clear and comprehensible form.

An additional advantageous configuration of the invention is that user interface information, especially control parameters, and/or programming language features and/or declaration parts can be allocated to the code parts. This results in the following advantages: In order to be able to use a technology object type as more than just a constant that can no longer be changed, the technology object type must inform the generating system of the possibilities of parameterization for its instantiated technology objects and particularly the available operating parameters. Thus, a user has the possibility of flexibly parameterizing a technology object in the generating system's interface.

Given that programming language features can also be loaded, it is possible that the available command library of the run time system can be dynamically expanded. In a user program, the user can use a command loaded in this way as if it were a command from the base functionality of the base system. When a user program is processed with a command loaded in this way within a user-level of the run level model, the associated code sequence of the operating system is processed on one of the system-levels of the run level model when this loaded command is called up. This takes place without any action on the part of the user. The user's flexibility is further increased by the allocation of the declaration and description parts to the code parts of the technology packet.

A sample configuration of the invention is presented in shown in the figures, as explained in below.

DETAILED DESCRIPTION OF THE INVENTION

Figure 1:
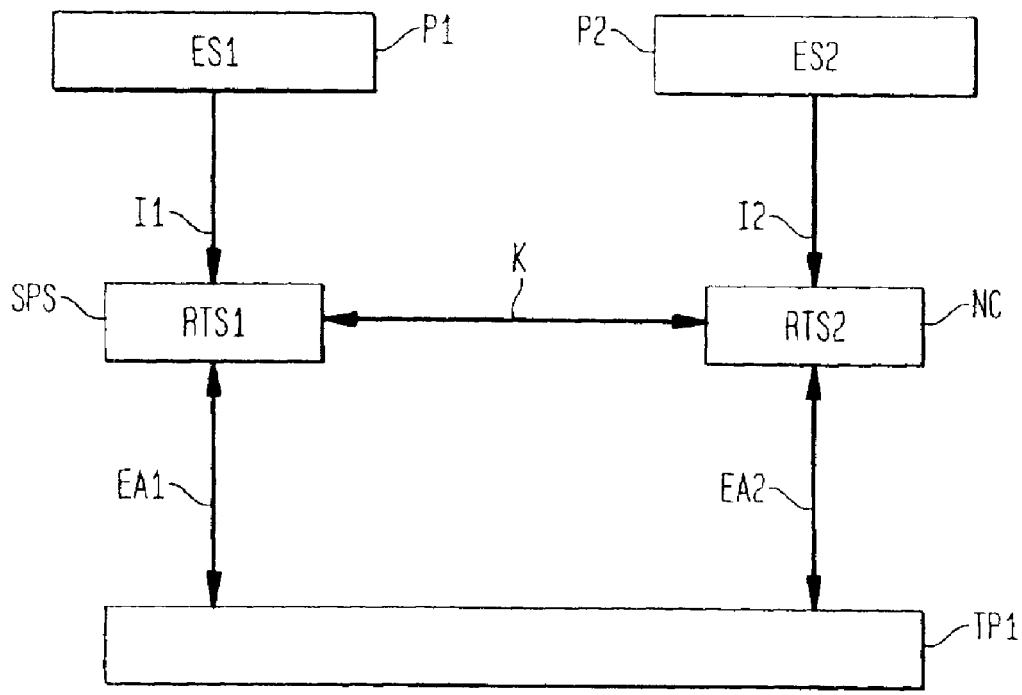
FIG. 1 shows the control of a technical process with separate PLC and motion controller. Programming is accomplished via separate programming systems.

The presentation in FIG. 1 is a structural diagram showing that parallel operation of a PLC and a motion controller NC takes place to control a technical process TP1. The PLC and the motion controller NC each contain a run time system RTS1 and RTS2, respectively. Communication between the two controllers takes place via a special auxiliary resource; the example shown is a bi-directional communications channel K. The controllers are typically programmed by the user in different programming languages with different generation interfaces, in other words, by means of separate programming or engineering systems P1, ES1, and P2, ES2. The significant disadvantage of this conventional configuration is, first, the cumbersome communication between the two systems, and second, the separate and different programming and engineering systems P1, ES1, and P2, ES2. The actual technical process TP1 is controlled via inputs and outputs EA1, EA2 of the controllers. There are information paths I1 and I1, on which the programs are loaded into each controller, between the programming system P1 and the PLC SPS, and between the programming system P2 and the numerical controller NC.

Figure 2:
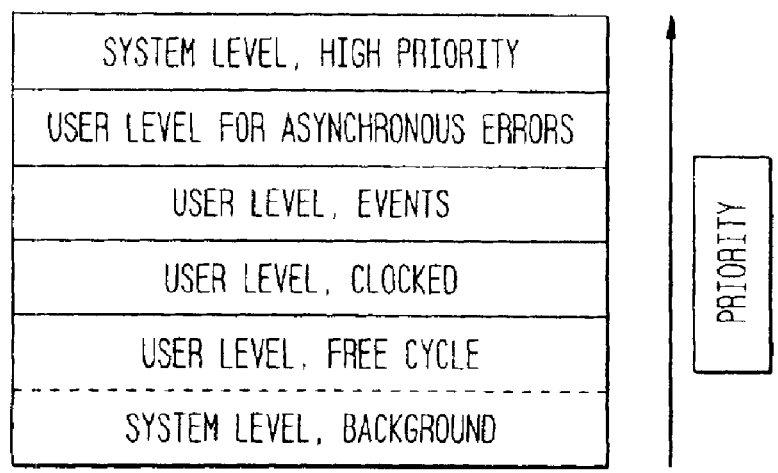
FIG. 2 shows the significant run levels of a classic PLC.

The diagram in FIG. 2 shows the significant run levels of a classic programmable logic controller (PLC; FIG. 1), arranged according to their priority. Increasing priority is indicated by an arrow. At the level of lowest priority, as indicated by a dotted line, two different tasks are processed, namely, a free cycle, i.e., "user-level free cycle," (see FIG. 5) and a background system-level, i.e., "system-level background," (see FIG. 5) in a round-robin or time-sharing procedure. Communication tasks, for example, are allocated to the background system-level. When this is followed by a clocked user-level, designated the "user-level, clocked," parameters can be assigned for the call-up frequency of the tasks or programs of this level. Monitoring is performed to determine whether the processing of a user program on this clocked level has been concluded in time before the start event occurs again. If the clock time elapses without the user program of the allocated level having been completely processed, a corresponding task is started in a "user-level for asynchronous errors" that is of next highest priority. The user can program out the handling of error statuses in this "user-level for asynchronous errors."

The "user-level, clocked" is followed by a "user-level events." Reactions to external or internal events take place within this "user-level events." A typical example of such an event is when a limit value is exceeded. Operating system tasks which ensure the operating procedure of the PLC are located in a "system-level, high priority."

Figure 3:
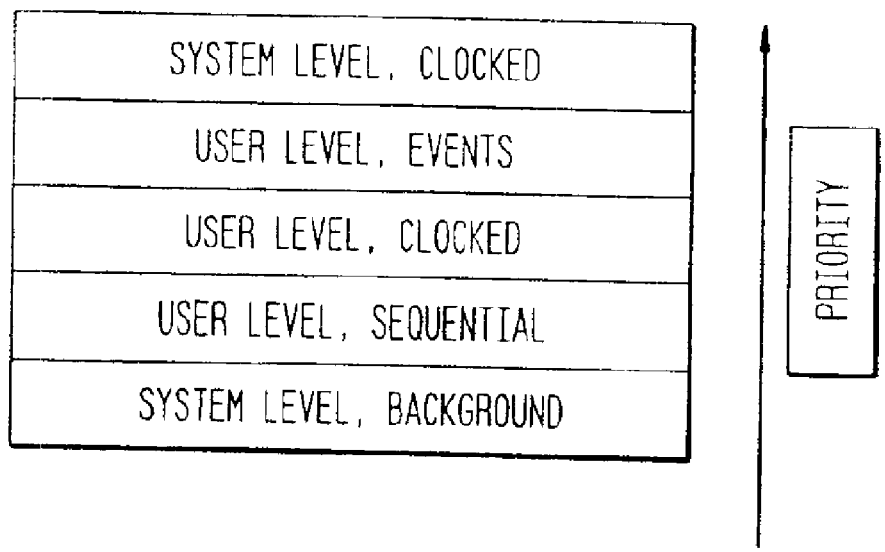
FIG. 3 shows the significant run levels of a motion controller.

The diagram in FIG. 3 shows the essential run levels of a motion controller (NC; FIG. 1). Here, too, the individual levels are arranged hierarchically according to their priority, as symbolized by an arrow. A "system-level background" and a "user-level sequential" have the same priority, namely the lowest. This association, based on similarity of tasks, is symbolized by a dotted line, as in FIG. 2. The tasks of the "user-level sequential" are processed together with the tasks of the "system-level background" in a round-robin procedure. Typical tasks of the "system-level background" are, for example, communication tasks. The program parts programmed by the user for the actual controller run in the "user-level sequential." If the controller encounters a movement or positioning command in one of these program parts, a suspend is set, that is to say, the user program is interrupted at this point. The execution of this movement or positioning command takes place in a "system-level, clocked" with highest priority. Each position controller that runs in the "system-level, clocked" carries out this movement or positioning command. After the command has been executed, the system jumps back to the "user-level, sequential," and the user program interrupted by the suspend is continued by a resume at the same point. In addition to the position controllers mentioned above, the "system-level, clocked" also contains the interpolation part of the controller.

A "user-level, clocked" is also constructed on the level of lowest priority. Cyclical tasks run here, for example, regulator functionalities.

A subsequent "user-level, events" includes such tasks as react to external or internal events. Such events might be alarms, for example.

Figure 4:
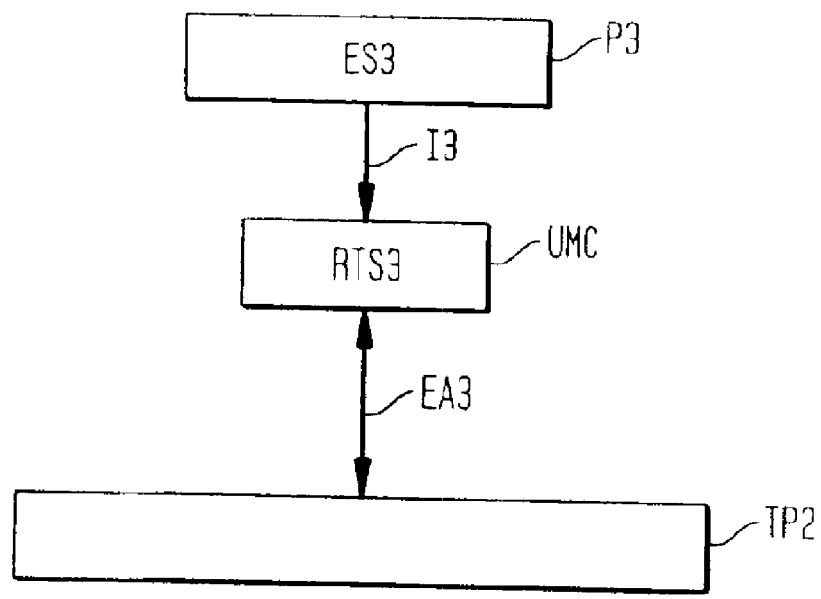
FIG. 4 shows a universal controller, that is, a combined PLC/NC controller with an associated programming system.

The diagram in FIG. 4 shows a technical process TP2 being controlled by a combined PLC/NC controller UMC. The acronym UMC stands for UNIVERSAL MOTION CONTROL. The controller UMC and the associated technical process TP2 are connected bi-directionally via inputs/outputs EA3. The combined PLC/NC controller is programmed via a shared programming system P3 or engineering system ES3, where the engineering system ES3 presents a convenient interface for the programming system P3, as in FIG. 1. The programs created in this way are transferred via an information path I3 into a run time system RTS3 of the universal motion controller UMC.

Figure 5:
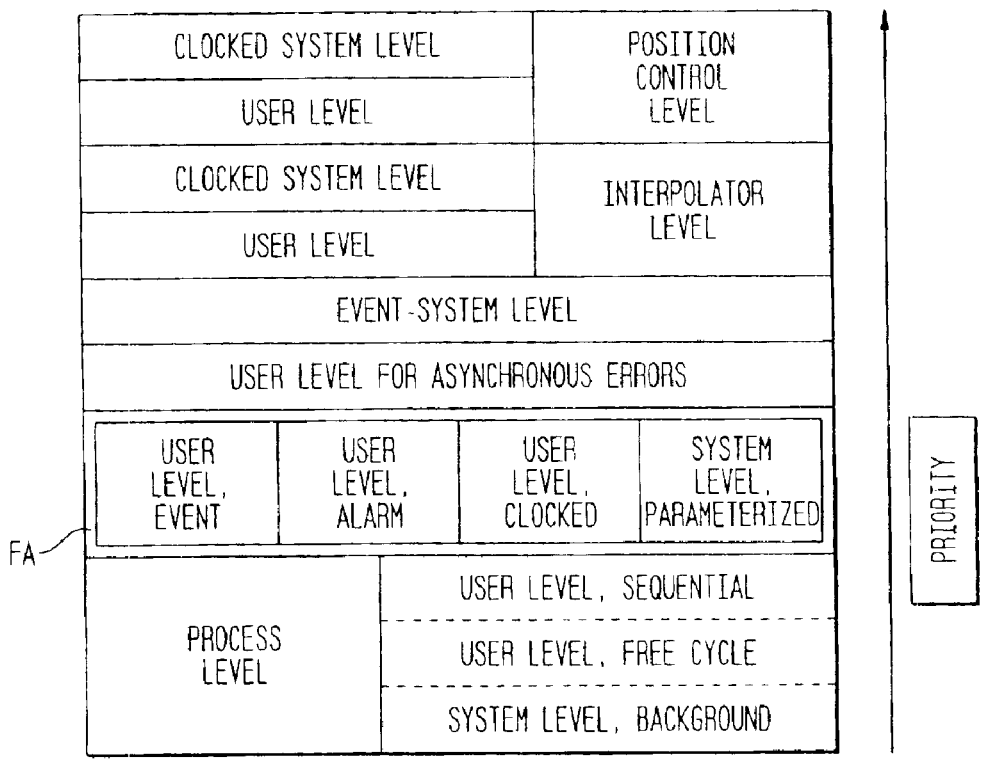
FIG. 5 shows the run level model of the universal controller.

The diagram in FIG. 5 shows the run level model of the universal motion controller. The prioritization of the levels is indicated as in the foregoing by an arrow pointing in the direction of the highest priority. The lowest-priority group of levels is the "level group, background processing." It consists of a "system-level background," a "user-level, free cycle," and a "user-level, sequential." The tasks of these three levels, which are of equal priority (indicated by the dotted outlines), are processed cyclically in a round-robin procedure. A higher-priority "run level" subsequent to the "level group background processing" is a user-level FA that is freely plan-able by the user to meet specific requirements, indicated by a double outline, for alarm and/or even and/or control and/or other cyclical tasks. This user-level FA thus consists explicitly of four types of levels, which in turn can be ranked by the user within the user-level FA according to their priority.

Type 1: user-level, Event
Type 2: user-level, Alarm
Type 3: user-level, clocked
Type 4: system-level, parameterized Levels of these types can be freely arranged by the user within the user-level FA, each with priorities that can be assigned by the user. Thus, the user has the possibility of obtaining a configuration for the universal motion controller that is optimal for the requirements and constraints of the control task and the technical process to be controlled.

In the "user-level, event," for example, tasks are arranged that react to inputs from peripheral devices. In the "user-level, alarm," for example, tasks are arranged that react when limit values are exceeded. The "user-level, clocked" contains cyclical tasks that can be programmed by the user. Programs that can be loaded from external sources can be integrated into the "system-level, parameterized." This makes it possible to expand the universal motion controller dynamically to include additional technological functionalities. Typically, tasks for slow control or monitoring responsibilities (for example, tasks with cycle times in the range of 100 ms) are loaded into this "system-level parameterized."

The level of next highest priority in the run level model for the universal motion controller is a "user-level for asynchronous errors." In this level, the user can program out the handling of error statuses, similar to with a PLC. For example, this "user-level for asynchronous errors" is where tasks reside that react to technological alarms. Within this "user-level for asynchronous errors," the user can also parameterize a specific number of levels for a product configuration. For the sake of clarity, the diagram does not include details about this. Thus, the user can allocate a defined priority to certain error events as needed.

Next is the "event system-level." The tasks in this "event system-level" react to critical internal or external events, for example, emergency shutdown.

The next level is an "interpolator level." It contains a "clocked system-level" and a "user-level."

The highest-priority level is the "position control level." It also contains a "clocked system-level" and a "user-level." The user-levels of the position control level and interpolator level contain tasks that are called up in the cycle of the position controller or interpolator. The run time of these tasks is monitored; if a time established by the system is exceeded, the level is canceled and an asynchronous error is initiated in the "user-level for asynchronous errors."

The position controller has a higher priority than the interpolator; in other words, the position controller cannot be interrupted by the interpolator, but the position controller can interrupt the interpolator.

Within the individual run levels in the run level model for the universal motion controller, additional prioritizing layers can be provided in addition to those already mentioned.

Figure 6:
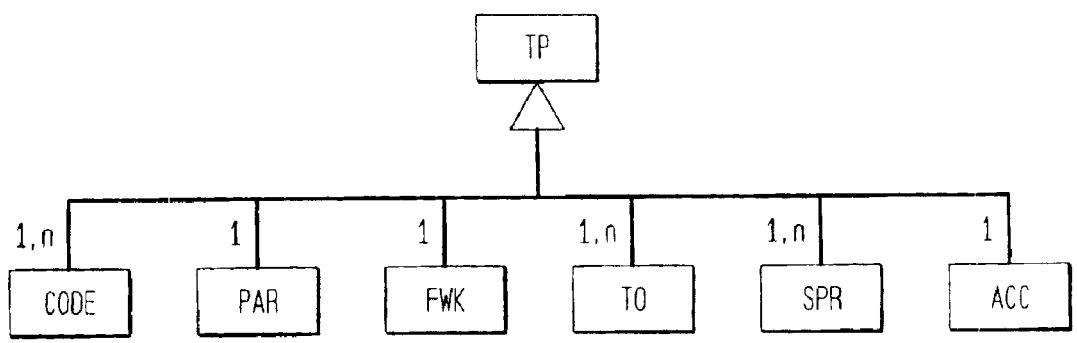
FIG. 6 shows as an object-oriented structural diagram a technology packet comprising a code part, parameter, firmware configuration, technology object type, programming language features component, and declaration part.

The diagram in FIG. 6 shows a technology packet TP and its components as a OO structure diagram, where the cardinalities are indicated by consecutive numerical notation:
a) executable code parts (Code)
b) parameters (PAR)
c) firmware configuration (FWK)
d) at least one technology object type (TO)
e) programming language features (SPR)
f) declaration and description part (ACC)

Code parts 1 to n (for example, C functions) are used for control guidance or position control or for another technology, for example. The code parts can contain, among other things, commands for temperature guidance, temperature control, or special technologies such as presses or plastic processing. The firmware configuration FWK determines how these code parts are mounted into the system-levels in the run level model of the controller and in what sequence they are processed, that is, executed. The FWK also includes the information about the system-level into which a code part is to be integrated, and, if several code parts are integrated in one system-level, in what sequence these code parts should be processed.

Figure 8:
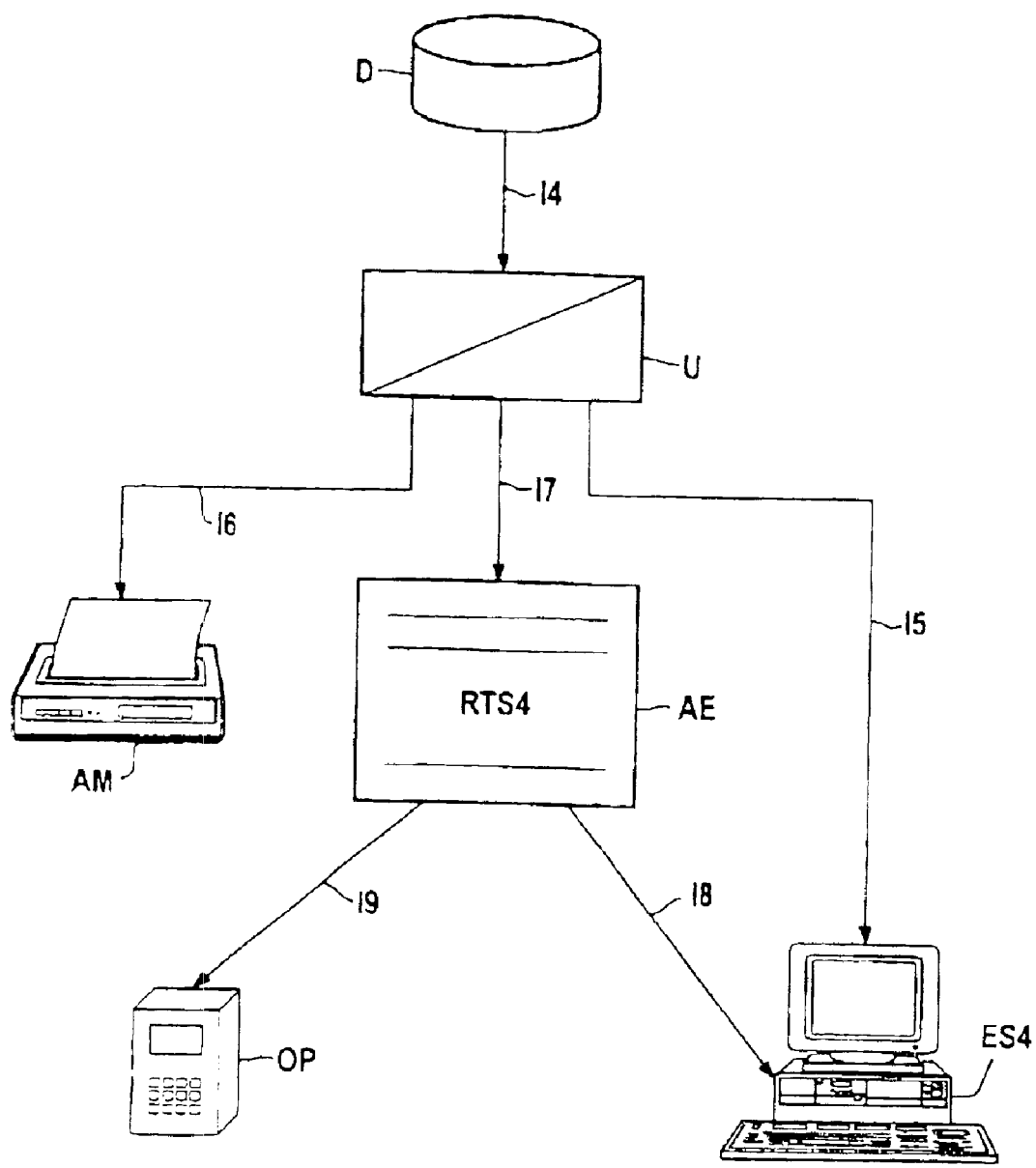
FIG. 8 shows how the descriptive or parameterization information from a data source is made available via a converter to the engineering system, the run time system, and an output medium.

The parameters part PAR contains interface and control parameters for the engineering system (ES; FIG. 1, FIG. 4, FIG. 8) as well as the mechanisms for the run time system (RTS; FIG. 1, FIG. 4, FIG. 8) that enable parameterization. Thus, the user can parameterize instances of technology object types TO in a technology packet TP according to her/his requirements.

Using the programming language features SPR 1 to n of a technology packet TP, the library of available programming language features of the engineering system (ES; FIG. 1, FIG. 4, FIG. 8) can be expanded to include commands and operators that are sufficient and practical for the underlying technology packet TP with its associated technology objects TP 1 to n. Programming language features SPR must be loaded into the engineering system (ES; FIG. 1, FIG. 4, FIG. 8) and into the run time system (RTS; FIG. 1, FIG. 4, FIG. 8) of the controller. After such programming language features (for example, "high temperature") have been installed in the engineering system (ES; FIG. 1, FIG. 4, FIG. 8), they are known in the compiler and in the interface or browser of the engineering system (ES; FIG. 1, FIG. 4, FIG. 8) and can be used directly by the user in her/his user programs. Plug & Play technology ensures that known programming language features are available in the engineering system (ES; FIG. 1, FIG. 4, FIG. 8) as well as the executable code piece in the run time system (RTS; FIG. 1, FIG. 4, FIG. 8). The user thus uses the specification of the programming language features and no longer needs to be concerned with implementation in the run time system (RTS; FIG. 1, FIG. 4, FIG. 8). In FIG. 8, discussed below, the interplay of loading, using, and processing programming language features SPR of technology packets TP is explained in greater detail.

To return to FIG. 6: The ACC component of a technology packet TP contains the description of all programming language elements contained in the technology packet TP, the description of all system variables, and the description of all types used in the technology packet TP. The ACC component thus corresponds to a declaration and description part for the technology packet TP. This ACC component is loaded principally into the run time system of the controller (RTS; FIG. 1, FIG. 4, FIG. 8). This ensures that all information relevant to existing technology packets TP and technology object types TO are located in the run time system of the controller and that control and monitoring devices (for example, operator panels) can easily be connected.

The following table shows where the elements in the technology packet TP are loaded within the controller: either into the engineering system (ES; FIG. 1, FIG. 4, FIG. 8) or into the run time system (RTS; FIG. 1, FIG. 4, FIG. 8), or into both the engineering system (ES; FIG. 1, FIG. 4, FIG. 8) and the run time system (RTS; FIG. 1, FIG. 4, FIG. 8).

| Element | TP Component | loaded into: |
|---|---|---|
| executable code | Code | RT |
| parameterizing interface (and corresponding knowledge about individual parameters) | PAR | ES |
| configuration information (information about how and where the parts are linked into the run system) | FWK | ES + RT |
| user interface (commands (MOVE, POS, . . . ), SFCs, SFBs, system variables, . . . ) | SPR | ES + RT |
| user interface (graphic information) | SPR | ES |
| description information for system variables, alarms, . . . | ACC | ES + RT |
| object types (technological objects) | TO | ES + RT |
| version information for consistency between RT, packets, and objects | ACC | ES + RT |

Figure 7:
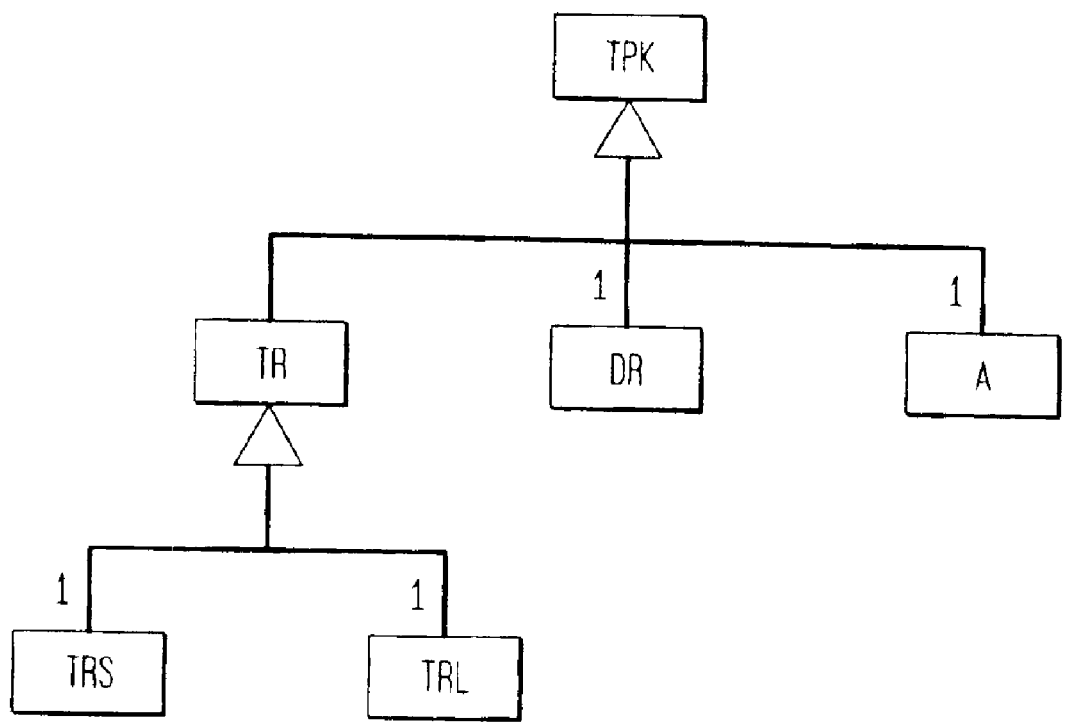
FIG. 7 shows as an object-oriented structural diagram technology object types for a plastics technology packet.

The diagram in FIG. 7 shows as examples possible technology object types (TO; FIG. 6) for a plastics technology packet TPK (TP; FIG. 6) as an OO structure diagram. For plastic processing or production, one usually needs a temperature controller and a pressure controller. The pressure that must be regulated by the pressure controller DR is typically produced by a single axis A, which compresses the material mass. Two temperature controllers are provided for temperature regulation in this example: a fast temperature controller TRS and a slow temperature controller TRL. As is apparent in the OO structure diagram, the slow temperature controller TRL and the fast temperature controller TRS are derived from the general temperature controller TR. The two temperature controllers TRS and TRL, the pressure controller DR, and the axis A are represented in this plastics technology packet by four technology object types TO, viz., TRS, TRL, DR, and A. The cardinality (numeral 1) indicates that exactly one fast temperature controller TRS and one slow temperature controller TRL, as well as exactly one pressure controller DR and one axis A are used in this example. The fast temperature controller TRS can conceal a PID controller, for example, while the slow temperature regulator can conceal a P controller, for example; these, however, are implementation details that do not concern a user of the functionalities of these technology objects in the engineering system (ES; FIG. 1, FIG. 4, FIG. 8). Thus, a user can use the functionalities of these technology object types (TO; FIG. 6) in the engineering system (ES; FIG. 1, FIG. 4, FIG. 8) without being concerned about implementation details.

The diagram in FIG. 8 shows that communication takes place to the converter U via the information path I4 from a data source D that contains the description information for system variables as well as alarms and/or commands as needed. The converter U generates parameterization information from the input data for the engineering system ES4, for the output medium AM, and for the run time system RTS 4. The converter U is called up before compilation of the run time or engineering system software. It generates sources that are then compiled during generation of the run time or engineering system software. The parameterization information is transferred from the converter U to the engineering system ES4 on the information path I5. The parameterization information generated by the converter U for documentation is forwarded via the information path I6 to the output medium AM, represented in FIG. 8 by a printer. An online help file on the screen is also conceivable as an output medium, for example. The parameterization information generated by the converter for the run time system is loaded via the information path I7 into the run level model AE of the run time system RTS4.

The converter U is always called up when it receives new parameterization information from the data source D via the information path I4. In such a case, the converter U generates new sources for documentation, for the run time system RTS4, and for the engineering system ES4.

During controller operation, the system variables loaded into the engineering system are supplied with current data for the technical process by the run time system RTS4 via the information path I8. The user can perform additional inputs on the engineering system ES4 in accordance with the current status of the technical process (TP1 TP2; FIG. 1 or FIG. 4).

The run time system RTS4 can supply information (for example, alarms) to a device for close machine monitoring and control (represented in FIG. 8 by an operator panel OP) via the information path I9.

The converter U does not appear during controller operation. The information paths I4, I5, I6, and I7 are used during generation of the controller software, but not during controller operation. Information paths I8 and I9 are used during controller operation.

What is claimed is:

1. A motion controller having an engineering system and a run time system, and that functionally combines classic tasks of a programmable logic controller and a numerical controller, comprising:
    a uniform run level model comprising a plurality of run levels of different types having differing priorities, the plurality of run levels comprising a plurality of user-levels and system-levels having differing priorities;
    a data source for containing description information for at least one of the group consisting of system variables, alarms and commands;
    a converter coupled to the data source, the engineering system, and the run time system, the converter generating, based an input received from the data source, parameterization information for the engineering system and the run time system, the generated parameterization information transferred to the engineering system and the run time system, such that the generated parameterization information is internally consistent in the motion controller; and
    a technology packet for loading into at least one of the group consisting of the engineering system and the run time system, the technology packet permitting a user to expand the functionality of the controller.

2. The motion controller according to claim 1, wherein relevant documentation information is forwarded by the converter from the data source to an output medium.

3. The motion controller according to claim 1, further comprising the following run levels:
    a) a position-control level, comprising an associated clocked system-level and user-level,
    b) an interpolator level, comprising the associated clocked system-level and user-level,
    c) an event system level for events requiring a response,
    d) a user-level for asynchronous errors,
    e) a third user-level that is freely plan-able by the user in accordance with specific requirements, for one of the group consisting of alarm tasks, event tasks, control tasks and cyclical tasks,
    f) a group of levels, formed from a series of motion sequences, free cycles, and other low-priority system tasks, for background processing, wherein a level group for real-time processing comprises run levels a to e.

4. The motion controller according to claim 1, wherein the technology packet comprises:
    a) code parts that represent controller specifics for the run time system; and
    b) a configuration part that exhibits the allocation of those code parts to each of the system-levels, as well as the sequence of their processing, wherein information relating to the configuration part is forwarded as needed to the engineering system.

5. The motion controller according to claim 4, wherein the information of the configuration part of a technology packet is delivered to the run time system and the engineering system by use of the data source and the converter.

6. The motion controller according to claim 4, therein each technology packet comprises at least one technology object type for the run time system.

7. The motion controller according to claim 4, wherein information presented on the user interface comprises at least one of the group consisting of operating parameters, programming language features and declaration parts allocated to the code parts.

8. A motion controller having an engineering system and a run time system, and that functionally combines classic tasks of a programmable logic controller and a numerical controller, comprising:
    a uniform run level model comprising a plurality of run levels of different types having differing priorities, the plurality of run levels comprising a plurality of user-levels and system-levels having differing priorities;
    a data source for containing description information for at least one of the group consisting of system variables, alarms and commands;
    a converter coupled to the data source, the engineering system, and the run time system;
    wherein the data source provides description information to the engineering system via the converter, and the converter generates, based on input received from the data source, parameterization information for the engineering system and the run time system, the generated parameterization information transferred to the engineering system and the run time system, such that the generated parameterization information is internally consistent in the motion controller; and
    the motion controller being further configured to permit a technology packet to be loaded into at least one of the group consisting of the engineering system and the run time system, the technology packet permitting a user to expand the funcionality of the controller.

9. The motion controller according to claim 8, wherein relevant documentation information is forwarded by the converter from the data source to an output medium.

10. The motion controller according to claim 8, further comprising the following run levels:
    a position-control level, comprising an associated clocked system-level and user-level,
    b) an interpolator level, comprising the associated clocked system-level and user-level,
    c) an event system level for events requiring a response,
    d) a user-level for asynchronous errors,
    e) a third user-level that is freely plan-able by the user in accordance with specific requirements, for one of the group consisting of alarm tasks, event tasks, control tasks and cyclical tasks, f) a group of levels, formed from a series of motion sequences, free cycles, and other low-priority system tasks, for background processing, wherein a level group for real-time processing comprises run levels a to e.

11. The motion controller according to claim 8, wherein the technology packets comprise:
   a) code parts that represent controller specifics for the run time systm; and
   b) a configuration part that exhibits the allocation of those code parts to each of the system-levels, as well as the sequence of their processing, wherein information relating to the configuration part is forwarded as needed to the engineering system.

12. The motion controller according to claim 11, wherein the information of the configuration part of a technology packet is delivered to the run time system and the engineering system by use of the data source and the converter.

13. The motion controller according to claim 11, wherein each technology packet comprises an adjusted number of technology object types for the run time system.

14. The motion controller according to claim 11, wherein the user interface information comprises at least one of the group consisting of operating parameters, programming language features and declaration parts are allocated to the code parts.

15. A combined programmable logic controller (PLC) and numerical controller (NC) that functionally combines tasks of a process controller and a motion controller, the combined PLC/NC controller comprising:

a uniform run level model comprising a plurality of run levels of different types having differing priorities, the plurality of run levels configured to minimize communication between the tasks of the process controller and the motion controller by arranging the taks of the process controller and motion controller within the plurality of run levels of different types having different priorities, such that programming of the PLC/NC controller is facilitated by a uniform programming language;

a data source for description information for at least one of the group consisting of system variables, alarms and commands;

a converter coupled to the data source, the engineering system, and the run time system, the converter generating, based on input received from the data source, parameterization information for the engineering system and the run time system, the generated parameterization information transferred to the engineering system and the run time system, such that the generated parameterization information is internally consistent in the motion controller; and a technology packet for loading into at least one of the group consisting of the engineering system and the tun time system, the technology packet permitting a user to expand the functionality of the controller.

* * * * *